J. F. MILAM.
MOLDING APPARATUS FOR PIPE JOINTS.
APPLICATION FILED OCT. 2, 1908.
943,558.
Patented Dec. 14, 1909.
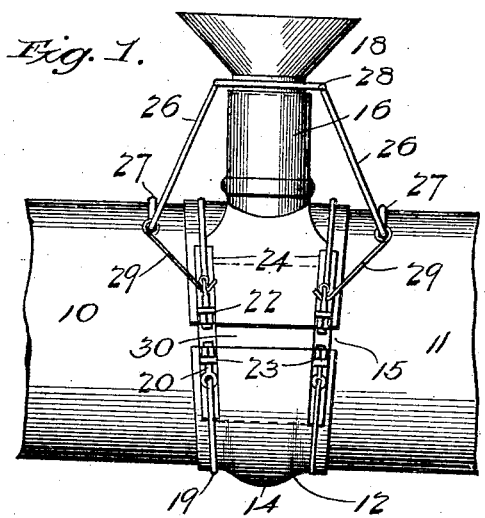
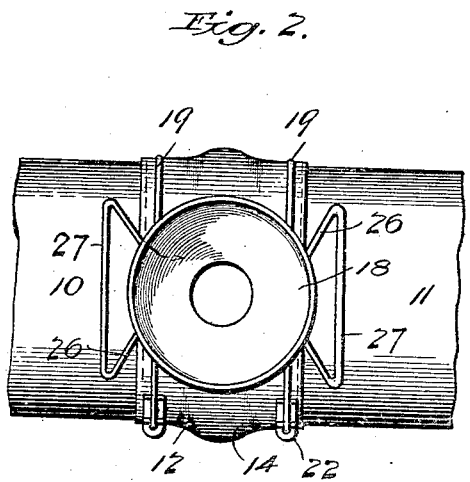
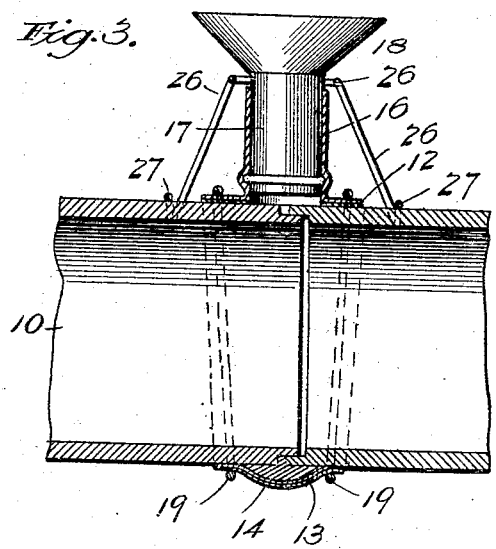
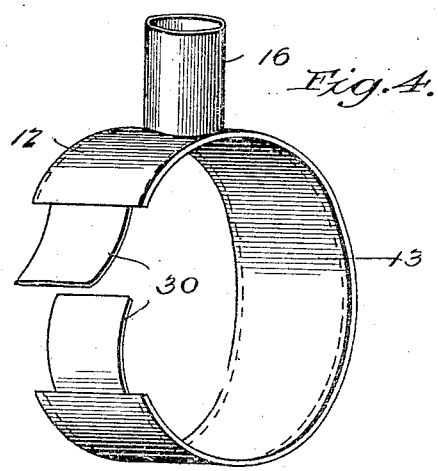
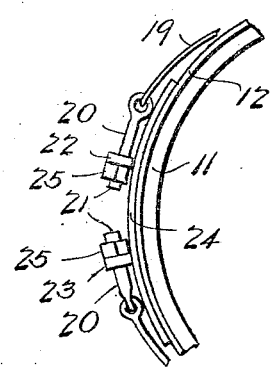
Witnesses
Inventor
John F. Milam,
By
Attorney

UNITED STATES PATENT OFFICE.

JOHN FRANKLIN MILAM, OF ROME, GEORGIA, ASSIGNOR OF ONE-HALF TO WILLIAM C. ENGLAND, OF ROME, GEORGIA.

MOLDING APPARATUS FOR PIPE-JOINTS.

943,558.  Specification of Letters Patent.  Patented Dec. 14, 1909.

Application filed October 2, 1908. Serial No. 455,817.

*To all whom it may concern:*

Be it known that I, JOHN FRANKLIN MILAM, a citizen of the United States, residing at Rome, in the county of Floyd and State of Georgia, have invented certain new and useful Improvements in Molding Apparatus for Pipe-Joints, of which the following is a specification.

This invention relates to molds for making pipe joints, and has specially in view a mold that may be readily attached to the pipe sections and which may be used for making either asphaltum joints or metal joints.

With the above and other objects in view, the invention comprises in its general organization a flexible mold casing for the meeting ends of the pipe sections which is detachably clamped in position so as to cause an even distribution of the joining material around, between, and over the pipe sections, and a funnel and support for the same, which coöperates with the flexible casing to facilitate the pouring of the joining material into the same.

In carrying out the objects of the invention generally stated above it will be understood that various modifications in details and structural arrangements may be resorted to, a preferred and practical embodiment of which is shown in the accompanying drawings, wherein—

Figure 1 is a side elevation of two pipe sections, showing the improved joint mold applied thereto. Fig. 2 is a top plan view of the same. Fig. 3 is an enlarged detail longitudinal sectional view, taken at the pipe joint. Fig. 4 is a perspective view of the mold removed from the pipes. Fig. 5 is an enlarged detail view of the clamping means.

Like characters of reference designate corresponding parts.

In the accompanying drawings, the numerals 10 and 11 designate the two pipe sections that are to be joined, the meeting ends of which are covered by the flexible casing 12 forming the mold. This flexible casing may be formed of a stout strip of textile or equivalent material, such as heavy canvas or duck, and is provided with an asbestos, or other heat resisting lining 13, to adapt the same for use in connection with molding molten metal around and between the ends of the pipe sections to form the joint, when such a joint is desired.

The flexible mold casing 12 is of such a width as to extend to each side of the meeting ends of the pipe sections, and the unsecured portion between its clamped edges is sufficiently loose or has sufficient surplus material to form with the pipe sections an annular pocket 14 for the liquid material. Said mold casing does not extend entirely around the ends of the pipe sections, as will be seen by reference to the drawings, a small space 15 being left between its ends, the function of which will be presently explained. An outstanding filling tube 16 forms a part of the mold casing and communicates with the annular pocket 14 and in which is mounted the neck 17 of a funnel 18, said funnel neck 17 serving to retain the funnel in engagement with the said flexible tube 16.

The flexible mold casing 12 is retained in position over the ends of the pipe sections through the clamping bands 19, preferably consisting of stout wire lengths, the ends of which are connected with tightener bolts 20 the threaded portions 21 of which pass through outstanding spaced apart eyes 22—23 carried by the clamp plates 24. The said clamp plates extend across the space between the ends of the flexible casing, and the clamping bands which extend from the outstanding eyes preferably converge toward the under side of the said casing. This arrangement of the clamping bands serves to decrease the size of the annular pocket 14 as the bottom, or underside, of the mold is reached, which restricts the flow of the liquid material as it approaches that point, thereby preventing the said material being thicker at the under side than at other points.

To facilitate the tightening of the clamping bands around the mold casing, the threaded portions of the bolts 20 are provided with adjusting nuts 25, which cooperate with the outstanding spaced apart eyes 22—23 of the clamp plates 24 to adjust said bands as desired.

In the accompanying drawings a funnel support has been shown which serves to retain the funnel in position. Said support is preferably formed of one piece of wire bent to form side legs 26 and bottom rests 27, the latter being curved to conform to the contour of the pipe sections. The upper portion of the said support is in the form of a ring 28 which surrounds the neck of the funnel. Holding hooks 29 which are connected with the side legs 26 of said funnel support, are adapted to have a detachable engagement with the clamping bands 19, or other suitable places, and serve to retain the said support in the desired funnel-holding position.

In applying the mold in position the same is placed over and around the ends of the pipe sections, and by means of the terminal pulling tabs 30 at the ends of the strip forming the mold casing, the same is drawn tightly to position. The clamping bands 19 are then placed around the mold casing adjacent the side edges thereof, and through the bolt and clamp plate, the same may be tightened to clamp the mold in position. The funnel support is then placed in position over the filling tube and the funnel passed through the same and into the filling tube. The joining material is then poured into the funnel and flows through the annular mold pocket, its passage through said pocket being restricted by the converging clamping bands, which causes the same to form evenly around and between the meeting ends of the pipe sections. After sufficient material has been poured into the pocket, the funnel may be removed and utilized to facilitate the pouring of sufficient material to cover the open space between the ends of the mold casing.

In forming joints between sections of small pipes, the filling tube 16 may be omitted, and the material poured directly into the annular pocket 14 through the ends thereof.

In practical experiments it has been found that heated and liquefied asphaltum makes a joint in which the necessary flexibility is obtained. This is especially so in the case where the joints to be made are between large concrete sewer or similar pipes. And in order to insure of the material assuming the proper joining position it has been found necessary to confine the material within a flexible mold casing. And as said material is poured into the casing from the upper side of the pipe, the tendency of the same is to run rapidly to the under side, thereby causing a joint to be formed the upper surface of which is a thin film while the under surface is a thick mass of material. To overcome this disadvantage the converging bands which encircle the mold casing are used, which restricts the flow of the material to the underside of the pipe sections, and thereby causes the material to form around said ends of the pipe sections evenly.

The space 15 between the edges of the strip 12 permits the strip to be drawn tightly about the pipes. At the same time this space is bridged by the overlapped tabs which will be sufficiently held in position by the clamp plates 24 to prevent the escape of the material.

While in the foregoing particular stress has been laid on the advantages for the invention in making asphaltum joints, it will of course be readily understood that through the medium of the heat resisting lining of the mold casing, the same may be readily used in connection with molten metal and the joint formed from such metal will be substantially the same as if asphaltum was used.

Claims:—

1. A molding apparatus for pipe joints, comprising a flexible strip of textile material having an opening therein between its ends through which the material is introduced, separate bands for clamping the margins of the strips to the pipes on opposite sides of the joint between such pipes, and means connecting the ends of the respective bands for drawing the same together to effect their clamping action.

2. A molding apparatus for pipe joints comprising a strip of flexible material, and adjustable clamping bands encircling said pipe ends and engaging opposite edge portions of the said strip, said bands converging toward the underside of the strip to form an annular molding casing the size of which decreases as the bottom of the strip is approached.

3. A molding apparatus for pipe joints comprising a flexible strip, means for holding said strip in annular form about the pipe ends to provide a mold casing, a filling tube communicating with said casing, and a funnel support surrounding said filling tube and resting upon the pipe ends.

4. A molding apparatus for pipe joints comprising a flexible strip, means for holding said strip in annular form about the pipe ends to provide a mold casing, a filling tube communicating with said casing, and a funnel support surrounding said filling tube and provided with side legs the bottoms of which are curved to conform to the contour of the pipe ends and the upper portion of which is provided with a funnel-engaging ring.

5. A molding apparatus for pipe joints comprising a flexible strip, means for holding said strip in annular form about the pipe ends to provide a mold casing, a filling tube communicating with said casing, a funnel support surrounding said filling tube and provided with side legs the bottoms of which are curved to conform to the contour of the pipe ends and the upper portion of which is provided with a funnel-engaging ring, and holding hooks carried by said side legs and adapted to detachably engage with the strip holding means to retain the funnel support in position.

In testimony whereof I hereunto affix my signature in the presence of two witnesses.

JOHN FRANKLIN MILAM.

Witnesses:
    M. T. LAUNIUS,
    E. M. PERRYBERRY.